United States Patent
Hill

(10) Patent No.: US 7,444,997 B2
(45) Date of Patent: Nov. 4, 2008

(54) ELECTRONICALLY CONTROLLED ELECTROMECHANICAL VALVE

(75) Inventor: David Hill, Commerce Township, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 10/582,798

(22) PCT Filed: Dec. 14, 2004

(86) PCT No.: PCT/EP2004/053435

§ 371 (c)(1),
(2), (4) Date: Apr. 27, 2007

(87) PCT Pub. No.: WO2005/059349

PCT Pub. Date: Jun. 30, 2005

(65) Prior Publication Data

US 2007/0272219 A1    Nov. 29, 2007

Related U.S. Application Data

(60) Provisional application No. 60/529,105, filed on Dec. 15, 2003.

(51) Int. Cl.
*F02M 33/02* (2006.01)
*F16K 11/074* (2006.01)

(52) U.S. Cl. .................................. 123/520; 137/625.46

(58) Field of Classification Search ................. 123/516, 123/518–520; 137/625.46
See application file for complete search history.

(56) References Cited

U.S. PATENT DOCUMENTS

| 3,124,162 | A | * | 3/1964 | Cameron | 137/625.11 |
| 4,703,737 | A | | 11/1987 | Cook et al. | |
| 5,388,611 | A | | 2/1995 | Harris | |
| 5,529,026 | A | | 6/1996 | Kurr et al. | |
| 5,617,815 | A | * | 4/1997 | Spies et al. | 123/41.1 |
| 5,967,185 | A | * | 10/1999 | Baruschke et al. | 137/625.29 |
| 6,164,248 | A | * | 12/2000 | Lehmann | 123/41.1 |
| 6,257,177 | B1 | * | 7/2001 | Lehmann | 123/41.44 |
| 6,289,913 | B1 | * | 9/2001 | Babin | 137/15.18 |

(Continued)

FOREIGN PATENT DOCUMENTS

EP    0 639 736 A1    2/1995

OTHER PUBLICATIONS

U.S. Appl. No. 11/718,140, filed Apr. 27, 2007, Hill et al.
U.S. Appl. No. 11/813,544, filed Jul. 9, 2007, Hill.
U.S. Appl. No. 11/910,343, filed Oct. 1, 2007, Hill et al.

*Primary Examiner*—Thomas N Moulis
(74) *Attorney, Agent, or Firm*—Oblon, Spivak, McClelland, Maier & Neustadt, P.C.

(57) ABSTRACT

An electronically controlled electromechanical valve having at least three ports through which a fluid can flow and at least three different stable positions in which at least 2 ports are in fluid communication. The valve includes a stationary outer housing including at least three bores, a rotating inner section that rotates about an axis and includes bores defining, with the bores of the housing, the at least three ports of the valve, and an electrical actuating system controlled by an electronic controller and configured to switch the valve from one position to another by rotating the inner section about its axis. A fuel system vapor management unit can include such a valve.

12 Claims, 4 Drawing Sheets

U.S. PATENT DOCUMENTS

| | | | |
|---|---|---|---|
| 6,371,060 B1 * | 4/2002 | Lehmann et al. | 123/41.1 |
| 6,382,191 B1 | 5/2002 | Curran et al. | |
| 6,539,899 B1 | 4/2003 | Piccirilli et al. | |
| 6,588,442 B2 * | 7/2003 | Babin | 137/1 |
| 6,745,996 B1 * | 6/2004 | Guthrie | 251/129.04 |
| 6,920,845 B2 * | 7/2005 | Lelkes et al. | 123/41.01 |
| 6,923,211 B2 * | 8/2005 | McLane et al. | 137/625.47 |
| 6,938,586 B2 * | 9/2005 | Manners et al. | 123/41.1 |
| 6,976,505 B2 * | 12/2005 | McLane et al. | 137/625.11 |
| 7,168,397 B2 * | 1/2007 | Chanfreau et al. | 123/41.01 |
| 2002/0047050 A1 * | 4/2002 | Leu et al. | 236/12.16 |
| 2007/0272219 A1 | 11/2007 | Hill | |

\* cited by examiner

ELECTRONICALLY CONTROLLED ELECTROMECHANICAL VALVE

The present application claims the benefit of U.S. application Ser. No. 60/529,105 filed Dec. 15, 2003.

The present invention relates to an electronically controlled electromechanical valve and to a fuel system vapor management unit comprising such a valve.

Electronically controlled valves are well known and often used in several technical fields like automotive and aircraft engine and fuel system vapor management. Such valves usually have two or three ports. Three port valves are advantageously used instead of two separate two port valves when such valves have at least one port in common, in order to have a more compact and simple design However, such valves usually have only 2 positions (each of them connecting 2 of the 3 ports).

For instance, U.S. Pat. No. 6,382,191 discloses a fuel tank pressure control system which includes an electronically controlled valve assembly able to either connect the fuel tank and the canister only (for tank venting during normal operation and refueling), or the canister and the engine only (for purging and burning the fuel vapors adsorbed on the canister). This system, which closes the communication between the fuel tank and the canister when the latter is connected to the engine, prevents too rich air/fuel mixtures from entering the engine and hence, prevents unburned hydrocarbons. The valve assembly used therein can either be constituted of 2 separate 2 port valves, or of only one single 3 port valve. The choice of 2 separate 2 port valves offers the advantage of being able to selectively and progressively control the purge flow, while simply turning on and off the tank venting valve. The choice of a regular, single three port valve does not allow that feature, but offers the advantage of a compacter and simpler design.

Therefore, it is an object of the present invention to provide an electronically controlled electromechanical valve, able of controlling tank venting during normal operation and refueling, and canister purge (i.e. recovered fuel vapors entry into the engine from the canister), which valve offers a compact and simple design while allowing at least one intermediate position for having an intermediate purge flow.

Accordingly, the present invention concerns an electronically controlled electromechanical valve having at least three ports through which a fluid can flow and at least three different stable positions in which at least 2 ports are in fluid communication, said valve comprising:

a stationary outer housing comprising at least three bores;

a rotating inner section which rotates about an axis and comprises adequate bores defining with the bores of the housing, the at least three ports of the valve; and an electrical actuating system being controlled by an electronic controller and being able to switch the valve from one position to another by rotating the inner section about its axis.

This integrated valve is designed in a radial fashion, which allows for a simple and compact system. In addition, it allows not only the two traditional positions connecting each completely 2 of the 3 ports, but also at least an additional one, for instance allowing only partial communication between 2 of the 3 ports.

Other advantages of this integrated valve are:

Lower Cost—This valve, which replaces 2 separate valves and associated piping system, reduces the total part count and hence, the cost of a system in which it is used.

Quieter Product—Less noise comes from a valve that does not have to use pulse width modulation to control fluid flow, as it is the case with valves equipped with a linear solenoid actuator (the latter cycles the valve open and closed to vary the flow restriction according to the engine control unit (ECU) and this often results in undesirable noise).

Digital Control Capability—A digitally controlled component is, in most occasions, easier to integrate into a microprocessor.

The valve according to the invention may be of any material (or combination of materials). It may be partially or totally made of metal and/or plastic(s). It preferably comprises polyacetal and may also comprise polyethylene at least in part of its surface in the case it is meant to be fixed by welding to a polyethylene fuel tank. Alteratively, it may be fixed mechanically (through a nail, screw . . . ) to the fuel sending unit flange.

The valve according to the invention has a stationary outer housing and an inner rotating section. The inner rotating section is generally of a substantially cylindrical shape, the axis of the cylinder corresponding to the axis of rotation of that part. The shape of the stationary outer housing is less critical but is generally substantially cylindrical as well. By "substantially cylindrical", it is meant that a substantial portion thereof is cylindrical, which does not exclude parts and/or appendices extending outside the generally cylindrical form (in the case of the housing, like electrical and fluid connections for instance).

The stationary outer housing comprises at least three openings (or bores) through which a fluid can flow and which define with adequate bores in the inner rotating section, at least three ports or passages through which a fluid can enter or exit the valve. According to some embodiments, the valve may comprise a fourth and even a fifth port allowing more fluid communication possibilities. In that case, in some position(s) of the valve, more than 2 ports may be into fluid communication.

The above mentioned bores and ports may have any shape and location inside the housing and the inner section. These shape and location are generally adapted to the shape and location of the fluid lines to which the ports will be connected.

The valve according to the invention has at least 3 stable positions, i.e. discrete positions in which at least 2 ports are in fluid communication and to which the valve switches from one to another in response to an electrical actuating system being controlled by an electronic controller. These 3 positions rare advantageously such that 2 of them allow complete fluid communication between at least 2 ports and the third one allows only partial fluid communication between 2 ports. There could also be more than one intermediate position for having more than one partial flow between 2 given ports. Besides, the valve may also comprises an additional closed position, in which none of the above mentioned 3 ports are in fluid communication, and which is held by a suitable default mechanism (like a spring for instance) able to ensure that the system is sealed in the event of electrical power loss.

In one embodiment of the present invention, the electrical actuating system comprises at least three coils fixed on the outer stationary housing and at least one magnet fixed on the inner rotating section, the coils being coupled to a power generator which is able to energize them, i.e. to generate an electrical current and make it circulate through them, in response to a signal from the electronic controller. In that case, each position of the valve is associated with a given coil being energized and attracting the magnet to it. In some cases, depending on the geometry and/or location of the fluid lines to be connected to the valve, it may be advantageous to use at least two magnets in order to allow for a quicker switch from one valve position to another as well as the desired number of positions to allow for partial communication between the engine and the canister. According to another embodiment of the present invention, the electrical actuating system comprises a separate actuator (motor), placed on top of the valve, which rotates the inner section of the valve and puts it in given positions in response to a signal from the electronic controller. In this case, it may be necessary to have multiple position feedback sensors on the valve body. These sensors are used to determine the position of the inner rotating member in relation to the outer stationary member.

The use of such sensors is interesting in the event that the part is rotated by an external source (as explained above) but also, with the coils system explained earlier, in the event of a power failure, in which the orientation of the part is not remembered.

The valve described above gives good results when used in a fuel system vapor management unit of an engine (and more particularly, of an internal combustion engine), especially if used in a unit similar to the one described in the above mentioned U.S. patent. In that case, one position of the valve ensures complete flow communication between a fuel tank and a vapor recovery system and the 2 other ones ensure respectively complete and partial communication between this vapor recovery system and the engine. The vapor recovery system is generally a charcoal canister, which adsorbs hydrocarbons from the tank though vapor vent lines allowing the tank to vent (during normal operation including filling) without sending hydrocarbons into the atmosphere. The hydrocarbons trapped in the canister are periodically routed to the engine for combustion, in an amount depending on the rotational speed of the engine and being metered with the valve according to the invention. This amount goes from zero when the engine is switched off (and when only the fuel tank and the canister are in total communication) to a maximum amount when the engine turns at a normal speed (and when only the canister and the engine are in total communication), and through an intermediate amount when the engine is turning at idle speed (and only the canister and the engine are in partial communication).

An additional feature that is often present in fuel system vapor management units is a vapor communication between the fuel tank and the filler pipe. In many cases it serves three functions. First it allows vapor in the fuel tank to be recirculated into the filler pipe and re-liquefied, thus minimizing vapor generation during refueling. Second, it serves as the communication path between the tank and the filler pipe during leak detection diagnostics. Finally, in a crash situation, the filler cap is often relied on for relieving any pressure incurred upon impact via an over pressure valve. For this reason as well, there needs to be an open communication between the fuel tank and the filler pipe. The use of a valve according to the present invention can solve this problem as well, provided that said valve is equipped with at least an additional port to be connected to a vapor recirculation line extending to the filler pipe.

In recent times however, there has been a push to restrict the size of the vapor recirculation line to control the amount of vapor that enters the filler pipe during refueling, thus minimizing the amount that escapes into the atmosphere. This creates a contradiction between the refueling function and the pressure relief function. Therefore, it is nowadays generally preferable to have both a vapor recirculation line with a large diameter (for unrestricted vapor recirculation to the filler pipe) and one with a smaller diameter, to have a restricted vapor recirculation flow during refueling. Alternatively, there could be only one vapor recirculation line but the access to it could be either through a port of large diameter or through a port of smaller diameter. Accordingly, in a preferred embodiment, use is made of a valve as described above which comprises at least five ports for being connected respectively to the fuel tank, to the canister, to the engine, to a passage of large diameter to a vapor recirculation line and to a passage of small diameter to the (or another) vapor recirculation line, the management of which ports to be in fluid communication being performed by an electronic controller. It may be advantageous however to at have at least 2 ports for being connected to the fuel tank in order to separate venting and vapor recirculation function, i.e. one port is meant for establishing fluid communication with the canister and the other one, with the filler pipe. In such a valve, more than 2 ports may be in fluid communication in some position(s) of the valve.

Some preferred embodiments of the present invention will be explained in more detail through FIGS. 1 to 9.

FIGS. 1 to 4 relate to a dual function 3 port valve which can be used in a fuel system vapor management unit both for venting of the fuel tank during refueling and normal operation, and for purging the canister.

FIG. 5 pictures an entire vapor management system using this valve.

FIGS. 6 to 8 relate to a 3 function 6 port valve ensuring besides venting and refueling, also the vapor recirculation function.

FIG. 9 pictures an entire vapor management system using this valve.

The basic components of the valve according to the first embodiment are shown in FIG. 1. These components comprise a stationary outer housing (1) and an inner rotating section (2), that rotates about and axis (9). The stationary outer housing has three ports. The large port (3) is in fluid connection with the vapor recovery canister. The port that exits out the side of the valve (4) is in fluid connection with the engine intake manifold. The port that exits out the bottom of the valve (5) is in fluid connection with a liquid vapor separator that is in fluid connection with the fuel storage tank. There is a movable fluid path (6) contained in the rotating inner section (2) which has 3 bores (1 on each end of the cut shown (6'), perpendicular to said cut, and one in said cut (6").

In the position shown in FIG. 1, the moving path (6) creates a fluid communication between an engine intake manifold and a vapor recovery canister of a fuel system vapor management unit. The rotating inner section (2) is positioned in this orientation by energizing the first of three coils (7), and attracting one of the two fixed magnet (8) to it (the one adjacent to it).

FIG. 2 shows the valve in a closed position, leaving no fluid communication between any of the ports. This position is held via a spring (not pictured) that ensures that the system is sealed in the event of a power loss. In addition, this position will be used during driving to prevent fuel from contaminating the vapor recovery canister.

Figure 2:
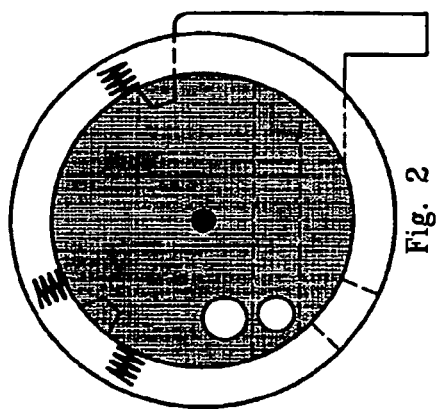
Figure 4:
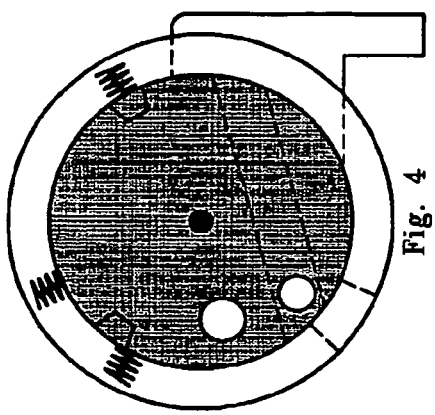
FIG. 4 shows the valve positioned such that there is restricted fluid communication between the vapor recovery canister and the engine intake manifold. Again, this position is held by energizing the circled coil and attracting the magnet adjacent to it.
Figure 1:
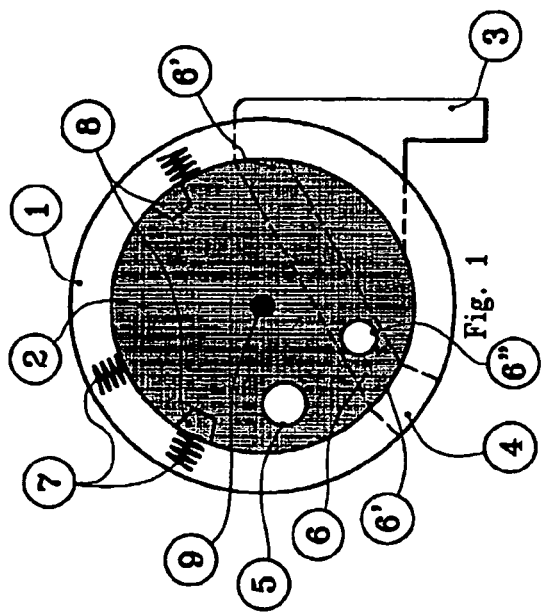
Figure 3:
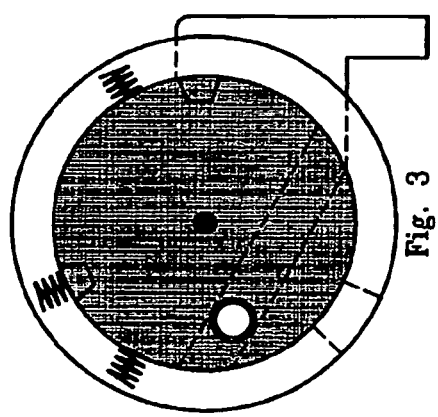
FIG. 3 shows the valve positioned such that there is fluid communication between the vapor recovery canister and the fuel storage tank. This position is held by energizing the circled coil and attracting the magnet adjacent to it, just as in FIG. 1.
Figure 5:
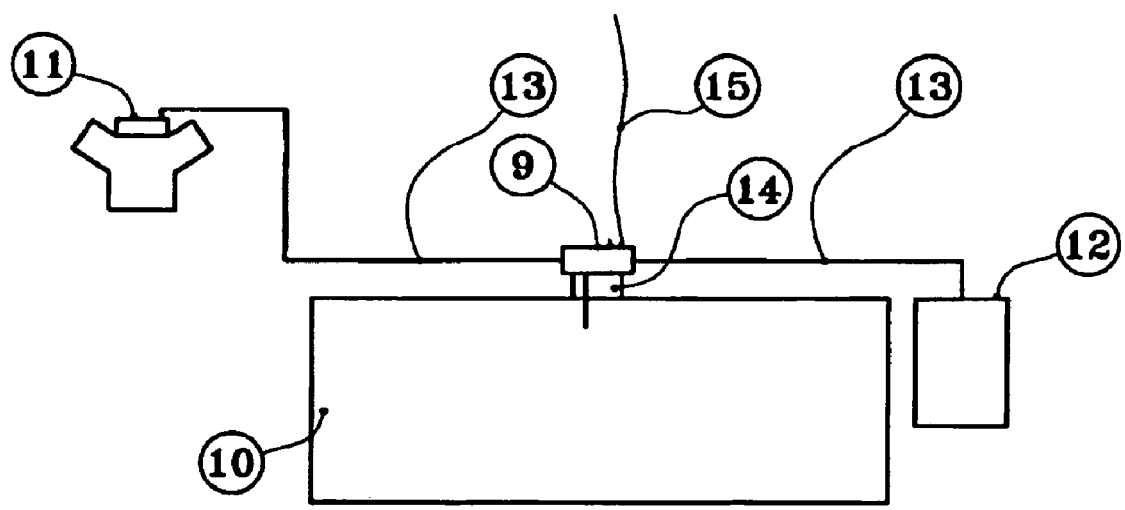

FIG. 5 shows a diagram of an entire vapor management system, including the valve pictured in FIGS. 1-4 (9), a fuel storage tank (10), an engine intake manifold (11), a vapor recovery canister (12), fluid communication lines (13), and fluid communication between the valve (9) and the fuel storage tank (10) via a liquid/vapor discriminator (14). In addition, an electronic communication line is shown (15). This line may be used to receive signals from the engine control module specifying a valve position, which are then processed by an integral signal conditioner on the valve. The communication line shown (15) could also consist of a number of power sources and a ground to energize the appropriate coils to make the valve function properly. A third scenario for the communication line (15) is where it would connect to a separate fuel system processor. A one-way check valve (not shown) may be necessary between the engine intake manifold and the valve to eliminate the possibility of back flow on engine deceleration.

Figure 6:
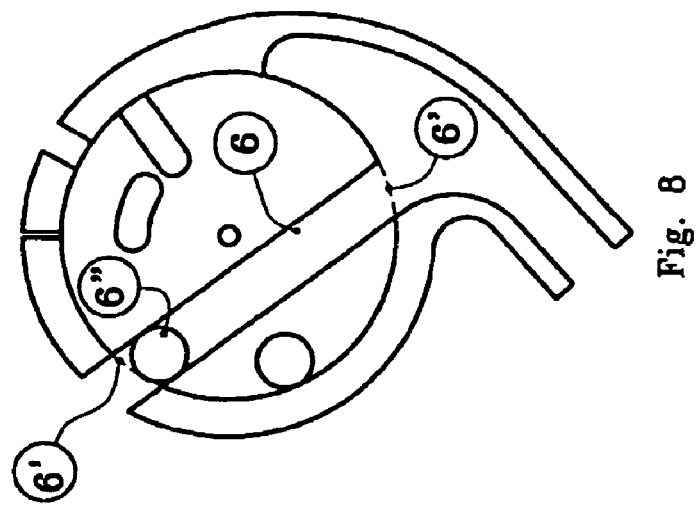
Figure 7:
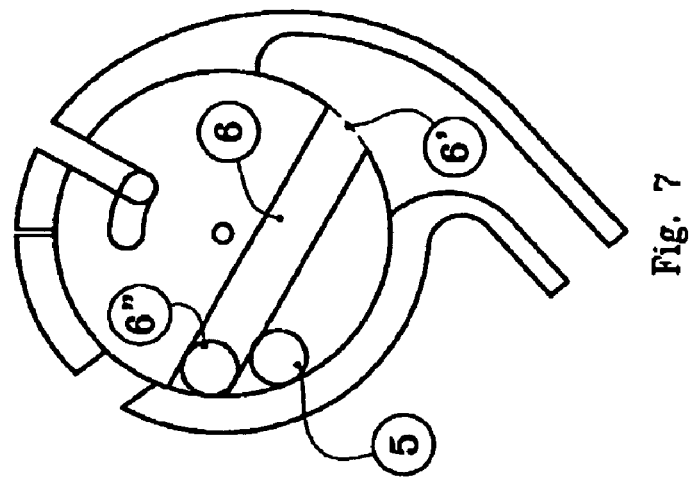
Figure 8:
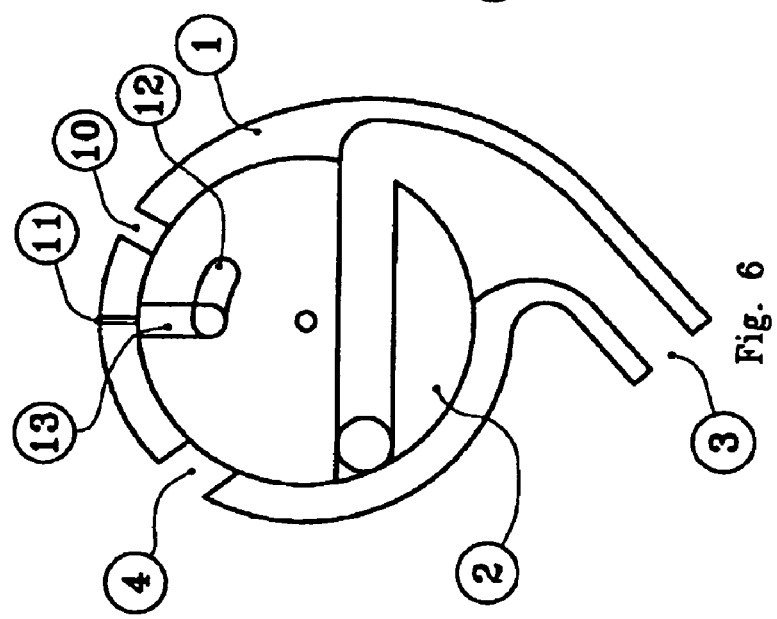

The valve of the second embodiment shown in FIGS. 6 to 8 also has 4 positions like the one of the first embodiment, three of which are shown. It comprises elements similar to those the valve according to pictures 1 to 4, bearing the same numbering (but not all of them being shown), plus additional ones: one port of a large diameter (10) to a vapor recirculation line, one port of a small diameter (11) to the vapor recirculation line and one additional port to the fuel tank (12); it also comprises an additional moving path (13) for connecting the fuel tank port (12) to either of the vapor recirculation ports (10)(11).

FIG. 6 shows the valve positioned such that there is fluid communication between the vapor recovery canister and the fuel storage tank. This position is held by energizing a coil and attracting a magnet adjacent to it (both not shown). In this position, the vapor recirculation line is in restricted communication between the tank and the filler pipe to control the amount of vapor that is reintroduced to the filler pipe during refueling.

FIG. 7 shows the valve in a "closed position", which in this case means; leaving no fluid communication between the fuel tank, the canister and the engine intake manifold. However, in this position, there is full communication between the fuel tank and the filler pipe through the large diameter vapor recirculation line in anticipation of leak diagnostics or a crash situation. This position is held via a spring (not pictured) to ensure that the system is sealed in the event of a power loss. In addition, this position will be used during driving to prevent fuel from contaminating the vapor recovery canister.

FIG. 8 shows the valve positioned such that there is fluid communication between the vapor recovery canister and the engine intake manifold. In this position, there is no fluid communication between the fuel tank and the filler pipe. This position can be varied (just as shown in the first embodiment, by the use of at least an additional coil providing at least one intermediate position) to adjust for the amount of purged vapor the engine can handle at a given time.

Figure 9:
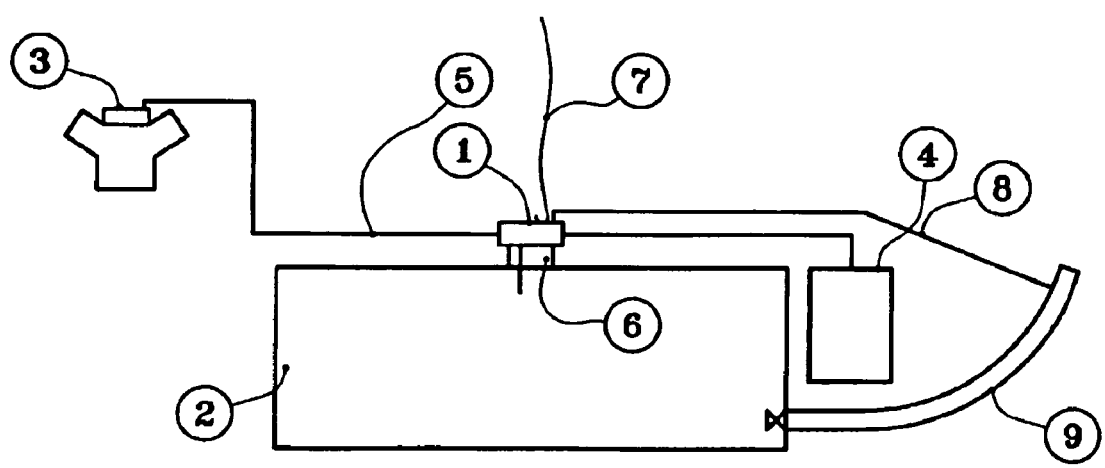

FIG. 9 shows a diagram of an entire vapor management system, including the valve pictured in FIGS. 6-8 (1), a fuel storage tank (2), an engine intake manifold (3), a vapor recovery canister (4), fluid communication lines (5), the fluid communication between the valve (1) and the fuel storage tank (2) being made via a liquid/vapor discriminator (6). A vapor recirculation line (8) is shown to be in vapor communication with the fuel storage tank (2) and the filler pipe (9) selectively based on the valve position. In addition, an electronic communication line is shown (7). This line may be used to receive signals from the engine control module specifying a valve position, which are then processed by an integral signal conditioner on the valve. The communication line shown (7) could also consist of a number of power sources and a ground to energize the appropriate coils to make the valve function properly. A third scenario for the communication line (7) is where it would connect to a separate fuel system processor. Note that a one-way check valve may be necessary between the engine intake manifold and the valve to eliminate the possibility of back flow on engine deceleration.

The invention claimed is:

1. A fuel system vapor management unit for an internal combustion engine comprising an electronically controlled electromechanical valve having at least three ports through which a fluid can flow and at least three different stable positions in which at least two ports are in fluid communication, one position ensuring complete flow communication between a fuel tank and a vapor recovery system and the two other positions ensuring, respectively, complete and partial communication between the vapor recovery system and the engine, the valve comprising:
    a stationary outer housing comprising at least three bores;
    a rotating inner section that rotates about an axis and comprises bores defining, with the bores of the housing, the at least three ports of the valve; and
    an electrical actuating system controlled by an electronic controller and configured to switch the valve from a first position to a second position by rotating an inner section about its axis.

2. The unit according to claim 1, further comprising an additional closed position, in which none of the three ports are in fluid communication, and which is held by a default mechanism configured to ensure that the electrical activating system is sealed in an event of electrical power loss.

3. The unit according to claim 1, wherein the electrical actuating system comprises at least three coils fixed on the outer housing and at least one magnet fixed on the inner rotating section, the coils being coupled to a power generator configured to energize the coils to generate an electrical current to circulate through the coils, in response to a signal from the electronic controller, so that each position of the valve is associated with a given coil being energized and attracting the magnet to the given coil.

4. The unit according to claim 1, wherein the electrical actuating system comprises at least two magnets.

5. The unit according to claim 1, wherein the electrical actuating system comprises a motor placed on top of the valve, which rotates the inner section of the valve and puts the inner section in given positions in response to a signal from the electronic controller.

6. The unit according to claim 1, wherein the valve comprises at least an additional port to be connected to a vapor recirculation line extending to a filler pipe.

7. The unit according to claim 6, wherein the valve comprises at least five ports configured to be connected respectively to the fuel tank, to a canister, to an engine, to a passage of large diameter to a first vapor recirculation line, and to a passage of small diameter to the first vapor recirculation line or a second vapor recirculation line.

8. The unit according to claim 7, wherein the valve comprises a second port configured to be connected to the fuel tank.

9. The unit according to claim 1, wherein the valve is configured to move to each of four different positions and includes at least five ports, one of which is a port of a first diameter and is configured to connect to a vapor recirculation line, and another of which is a port of a second diameter smaller than the first diameter, the port of a second diameter also being configured to connect to a vapor recirculation line.

10. The unit according to claim 9, wherein at least two of the ports open in a direction parallel to the axis of the rotating inner section of the valve.

11. The unit according to claim 10, wherein the at least two ports open in a same direction.

12. The unit according to claim 1, wherein the valve is configured to maintain a position in which none of the ports is in fluid communication with any other port while the valve is not energized.

* * * * *

UNITED STATES PATENT AND TRADEMARK OFFICE
CERTIFICATE OF CORRECTION

PATENT NO. : 7,444,997 B2
APPLICATION NO. : 10/582798
DATED : November 4, 2008
INVENTOR(S) : David Hill It is certified that error appears in the above-identified patent and that said Letters Patent is hereby corrected as shown below:

Column 1, line 15, change "design However" to --design. However--;

line 18, change "Pat. No. 6,382,191" to --Patent 6,382,191--.

Column 2, line 40, change "These" to --The--;

line 48, change "rare" to --are--;

line 53, change "comprises" to --comprise--.

Column 3, line 29, change "though" to --through--.

Column 4, line 10, delete "at", (1st occurrence);

line 32, change "and" to --an--.

Column 5, line 32, change "means; leaving" to --means leaving--.

Signed and Sealed this

Tenth Day of March, 2009

JOHN DOLL
*Acting Director of the United States Patent and Trademark Office*